United States Patent
Lundahl

[11] 3,728,849
[45] Apr. 24, 1973

[54] HAY LOADER

[75] Inventor: Ezra Cordell Lundahl, Providence, Utah

[73] Assignee: Hesston Corporation, Hesston, Kans.

[22] Filed: Nov. 14, 1969

[21] Appl. No.: 876,944

[52] U.S. Cl. ............................56/1, 56/350, 56/364, 100/226, 100/233, 214/83.26, 214/83.36, 214/520
[51] Int. Cl. .............................................A01d 89/00
[58] Field of Search......................56/16.4, 16.6, 364, 56/350, 1, 351–353; 214/519–522, 83.26, 5, 83.36, 82; 280/467–471; 100/226, 233

[56] References Cited

UNITED STATES PATENTS

| 453,369 | 6/1891 | Howland | 280/468 X |
|---------|--------|---------|-----------|
| 830,292 | 9/1906 | Bernhard | 56/350 |
| 2,585,891 | 2/1952 | Worsdell | 56/364 X |
| 3,280,727 | 10/1966 | Jonas | 100/233 X |
| 3,402,829 | 9/1968 | Leedahl | 214/5 |
| 3,556,327 | 1/1971 | Garrison | 214/82 X |

*Primary Examiner*—Louis G. Mancene
*Assistant Examiner*—J. A. Oliff
*Attorney*—Schmidt, Johnson, Hovey & Williams

[57] ABSTRACT

In the harvesting of agricultural crops, the crop is lifted off the ground continuously by a pickup unit as the vehicular harvesting machine is advanced across the field along the crop windrow. The machine has a crop-handling assembly which includes an elevator for receiving the crop from the pickup unit and continuously raising the crop to a level higher than the bed of the crop-receiving body of the machine. The crop-handling assembly also includes a conveyor which continuously receives the crop from the upper end of the elevator and moves the crop in a horizontal direction rearwardly for dumping into the open top of the body.

The conveyor is extensible fore and aft of the body so that as the crop gravitates from the rear end of the conveyor it is spread evenly front to rear of the body. The entire elevator-conveyor assembly and the pickup unit thereon are also shiftable laterally with respect to the wheeled vehicle to spread the crop evenly from side to side of the body.

The crop is fed between the side walls of the body and between upward extensions of such walls, and those extensions are shifted against the crop from time to time to compress it against the bed of the body and form a stack. Each extension also has a ram for compressing the sides of the stack in the body.

The body is tiltable rearwardly and has a tailgate which may be unlocked and swung upwardly to permit the stack to be pushed rewardly out of the body off the tilted bed through use of a rearwardly moving, upright "false front."

14 Claims, 12 Drawing Figures

INVENTOR
Ezra Cordell Lundahl
BY Schmidt, Johnson, Hovey, Williams & Chase
ATTORNEYS INVENTOR
Ezra Cordell Lundahl BY Schmidt, Johnson, Hovey, Williams & Chase
ATTORNEYS Patented April 24, 1973  3,728,849

INVENTOR
Ezra Cordell Lundahl
BY Schmidt, Johnson, Hovey,
Williams & Chase
ATTORNEYS INVENTOR
Ezra Cordell Lundahl BY Schmidt, Johnson, Hovey,
Williams & Chase
ATTORNEYS

HAY LOADER

It is an important object of our present invention to automatically stack agricultural crops as the same are picked up from the field through use of a crop receiving body, conforming in shape and size to the type of stack desired, and capable of being advanced across the field for reception of the crop as it is loaded into the body through use of a pickup, an elevator and a conveyor.

Another important object of the instant invention is the provision of a harvesting method which incorporates a compressor capable of being used periodically during the loading operation for producing a compact stack which, when unloaded, maintains its size, shape and compactness without need for further attention.

Still another important object of our instant invention is to produce a stack of hay or the like which will withstand deleterious effects of open storage by virtue of the inclusion of an arrangement capable of distributing the crop evenly throughout the body of the implement both fore and aft of the body and transversely thereof. In the drawings:

FIG. 2a is a vertical cross-sectional view taken on line 2—2 of FIG. 1, showing the remaining portion of the hay loader illustrated in FIG. 1;

Figure 8:
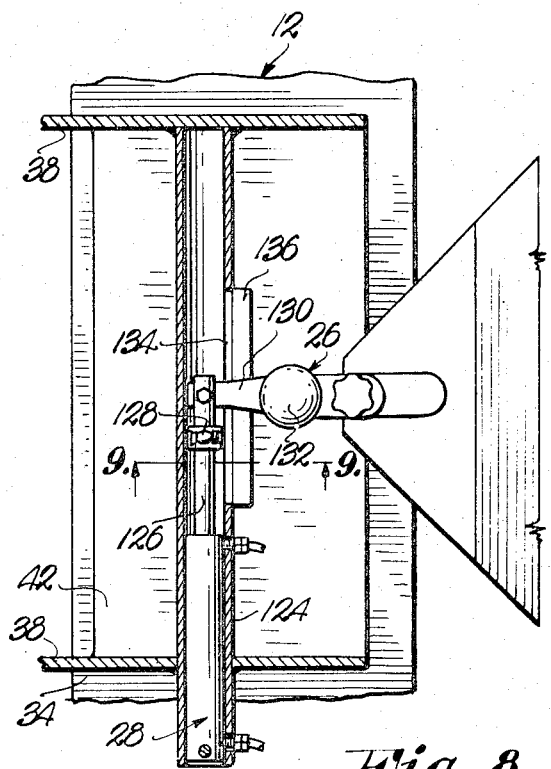
FIG. 8 is a fragmentary, horizontal cross-sectional view through the hitch and coupling between the loader and the body.

The farm implement illustrated in the drawings includes a loader broadly designated by the numeral 12, provided with a crop pickup unit 14, and disposed in tandem relationship to an open top, crop receiving body 16, the loader 12 and the body 16 being supported by ground engaging wheels 18 and 20 respectively. The loader 12 has a conveyor assembly 22 for transferring the crop, such as hay 24 (FIGS. 10 and 11) from an elevator 23 and feeding the hay 24 into the body 16 through the open top of the latter. The loader 12 and the body 16 are relatively movable during advancement by virtue of a special hitch broadly designated 26, such relative movement in a direction lateral to the normal path of travel of the implement being controlled by power means in the nature of a fluid piston and cylinder assembly 28 (FIG. 8). The purpose of the power means 28 is to distribute the hay evenly in the body 16 in a lateral direction as the loader 12 is placed in tow through use of a tongue means 130.

Figure 1:
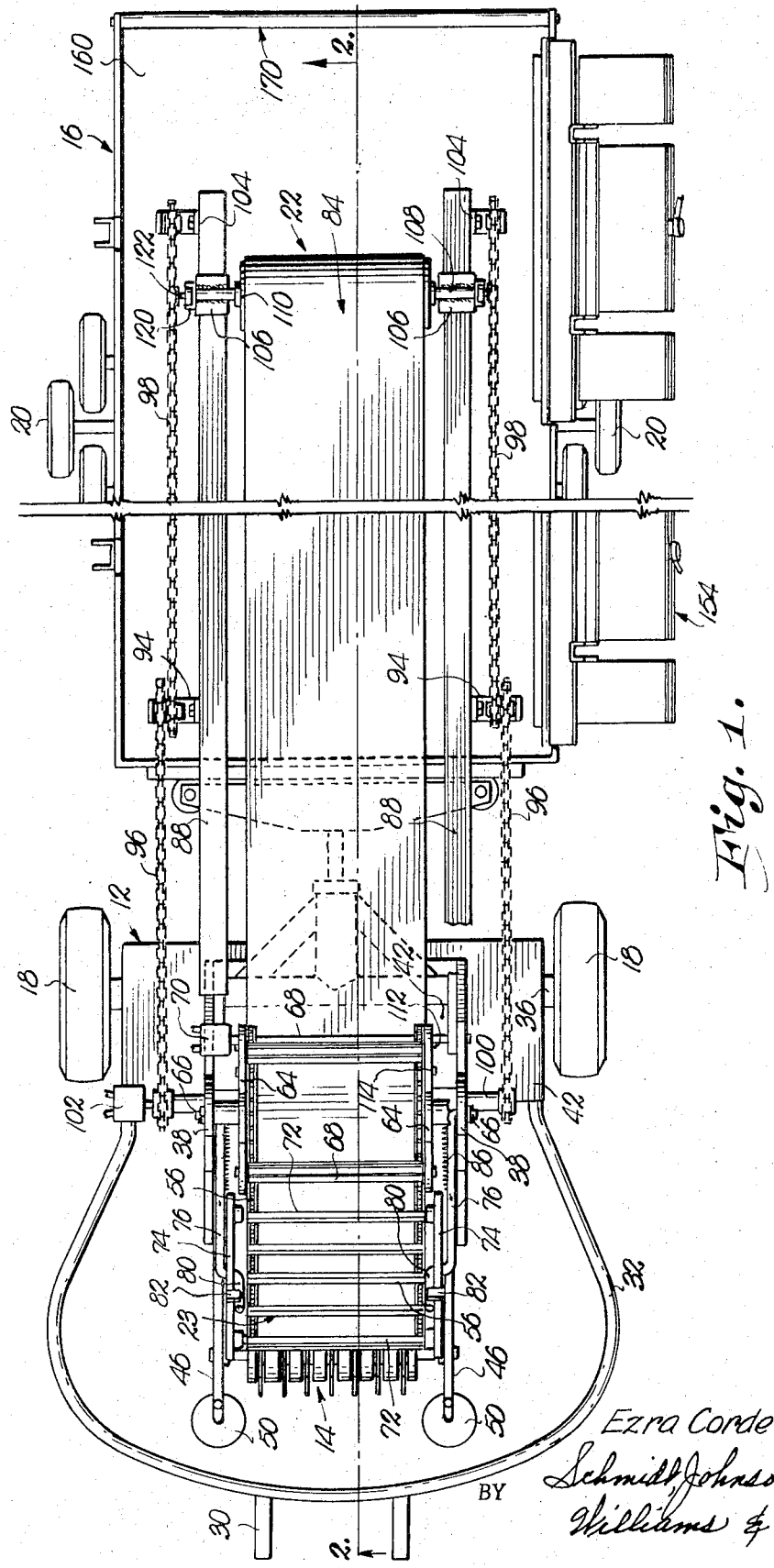
FIG. 1 is a plan view of a hay loader made pursuant to and capable of carrying out the method of our present invention.

The U-shaped yoke 32 illustrated in FIG. 1, and to which the tongue means 30 is affixed, clears the loader 12 and particularly the pickup 14 during turning movements and its legs are rigid to a transverse plate 34 (FIG. 2) that is in turn secured to the axle 36 of wheels 18.

Loader 12 is entirely supported by the plate 34 and includes a frame which comprises a pair of uprights 38, interconnected by a crossbar 40 and a cross plate 42, the latter of which is in turn supported for oscillatory movement on the plate 34 and pivotally connected thereto through an upright kingpin 44, aligned with the axle 36 directly thereabove.

The rotary pickup unit 14, which may be driven in any suitable manner (not shown) is carried by a pair of arms 46 therebetween, the arms 46 being swingable on corresponding uprights 38 about a roller 48 and being supported by a pair of freely rotating ground engaging discs 50. The hay or other crop picked up by the unit 14 is delivered to an endless belt 52 which is trained over the roller 48 and over a second roller 54 between the arms 46. The belt conveyor 52 can be driven in any suitable manner (not shown) and operates to deliver the crop from the pickup unit 14 to the elevator 23.

The elevator 23 includes a pair of endless chains 56 interconnected by cross flights 58. The chains 56 are trained over two pairs of uppermost sprocket wheels 60 and two pairs of lower sprocket wheels 62. Each upright 38 carries a generally T-shaped hanger 64 for free swinging movement about a horizontal axis 66, the two hangers 64 being interconnected by the shafts 68 for sprocket wheels 60. The chains 56 are driven by a hydraulic motor 70 (FIGS. 1 and 3) attached to one of the shafts 68.

The shafts 72 for the lowermost sprocket wheels 62 span the distance between a pair of plates 74, each plate or bar 74 being swingably carried by an arm 76 capable of shifting vertically at its uppermost end within a slot 78 in a corresponding upright 38. The terminal ends 80 of the arms 76 are disposed between a pair of spaced stops 82 on the corresponding bar 74 for limiting the extent of swinging movement of the bars 74 with respect to the arms 76.

Figure 2:
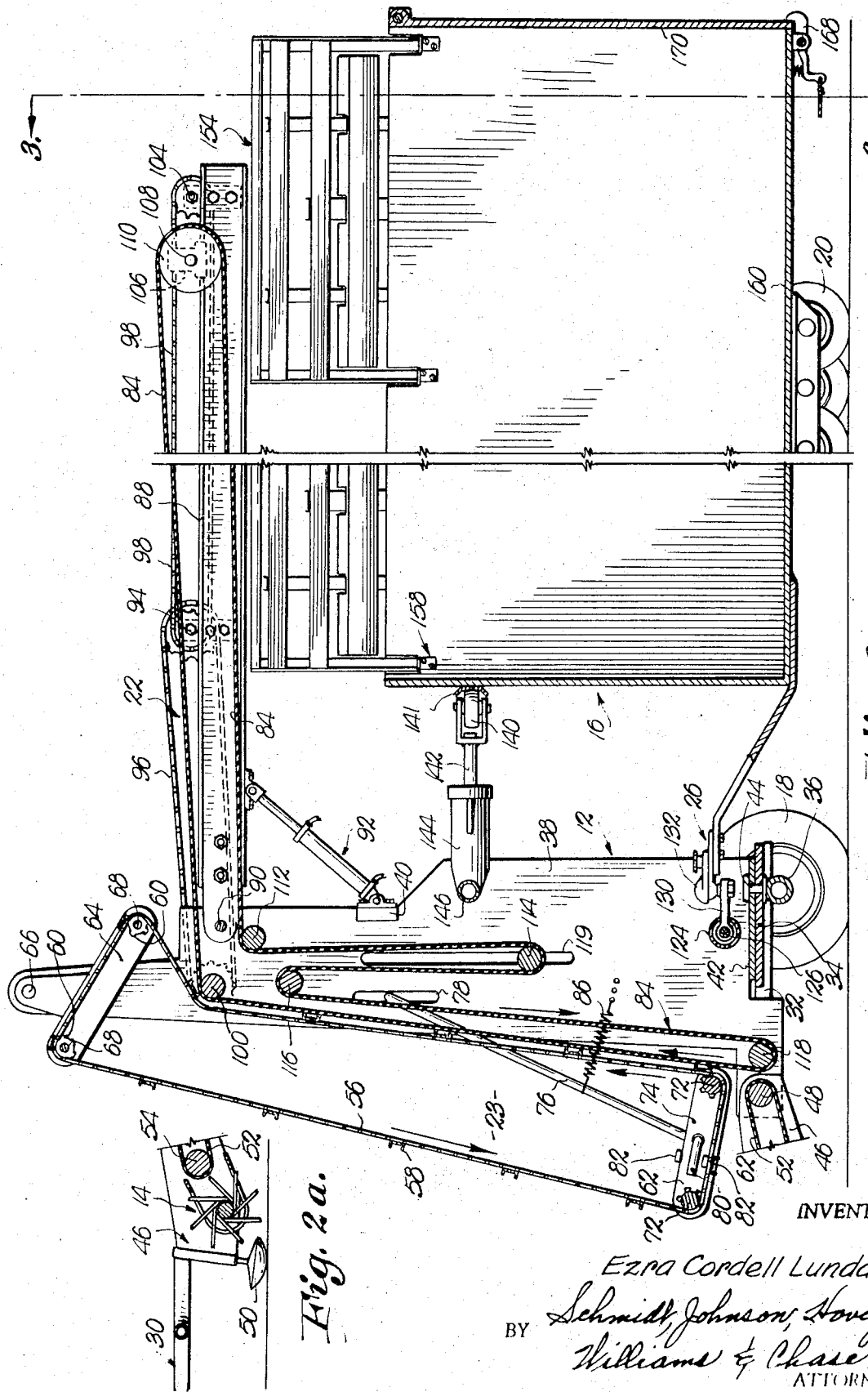
FIG. 2 is a vertical cross-sectional view taken on line 2—2 of FIG. 1, showing a portion of the hay loader illustrated in FIG. 1.

The elevator 23 includes additionally a continuous belt 84 common to the conveyor 22 and the upwardly moving stretch of the chains 56 and flights 58 are yieldably held biased toward the upwardly moving stretch of belt 84, as indicated by arrows in FIG. 2, by springs 86 interconnecting arms 76 and corresponding uprights 38.

The conveyor assembly 22 includes a pair of spaced elongated I-beams 88 swingably attached to the uprights 38 by shaft 90 and extending therefrom into overlying relationship to the body 16, the raising and lowering of the beams 88 being accomplished by use of a pair of fluid piston and cylinder assemblies 92 pivotally interconnecting the crossbar 40 and the beams 88.

Brackets 94 on beams 88 each supports a pair of sprocket wheels for continuous chains 96 and 98, the continuous chains 96 being also trained over sprocket wheels that are secured to a roller 100 for rotation therewith, the roller 100 spanning the distance between the uprights 38 and being driven by a hydraulic motor 102. Brackets 104 at the free ends of the beams 88 opposite to shaft 90 carry sprocket wheels for the endless chains 98. Accordingly, all four chains 96 an 98 are driven by the motor 102 which also rotates the roller 100.

The beams 88 carry slide clips 106 which reciprocate longitudinally of the beams 88 and are interconnected rigidly by a shaft 108 which in turn supports a roller 110 for the belt 84. Accordingly, the belt 84 extends from the roller 110 toward the shaft 90, over a roller 112 carried by uprights 38, thence downwardly and beneath a roller 114 carried by uprights 38, and then upwardly over still another roller 116 carried by uprights 38, and then downwardly under a roller 118 spanning the distance between uprights 38 adjacent the roller 48, and then upwardly along the upwardly moving stretch of the chains 56 and flights 58, over the roller 100, and then back to the roller 110. The roller 114 is freely reciprocable within vertical slots 119 in uprights 38. It follows then that the belt 84 is driven by the roller 100 from motor 102.

Each clip 106 has an upstanding channel 120 rigid thereto within which a roller 122 reciprocates vertically, the rollers 122 being secured to one link of a corresponding chain 98. Thus, chains 98 reciprocate the roller 110 longitudinally of the beams 88 through rollers 122, channels 120, clips 106 and shaft 108. The rollers 122, by virtue of their freedom of reciprocation vertically within the channels 120, pass over the sprocket wheels for the chains 98 at the brackets 94 and 104. During reciprocation of the roller 110, the roller 114 rises and falls within the slot 119 to take up the slack in the belt 84 when the roller 110 moves toward the shaft 90 and to pay out the belt 84 during movement of the roller 110 toward the brackets 104.

The operation of the loader 12 as thus far described may therefore be briefly summarized as follows. As the implement is towed across a field through use of tongue 30 and yoke 32, the crop, which is preferably in a windrow, is picked up by the unit 14 and delivered to the short belt conveyor 52 beneath the lower stretch of elevator 23, the flights 58 cooperating with the belt 52 to deliver the crop to the belt 84. The angularity of the lower stretch of elevator 23 will change from time to time, depending upon the bulk of the crop, because of the swingability of the bars 74 on the arms 76, limited by stops 82.

The crop enters between the upwardly moving stretch of elevator 23 and belt 84, and here again, the elevator 23 will move toward and away from the belt 84 against the action of springs 86, depending upon the bulk of the crop, all as made possible by the swinging of arms 76 and of the brackets 94. The motors 70 and 102 may be synchronized if desired for driving the chains 56, 96 and 98 as well as the belt 84 at a preselected relative speed.

When the crop reaches the upper stretch of the belt 84 of the conveyor assembly 22, it emerges from beneath the elevator 23 and travels rearwardly for gravitation into the body 16 at the roller 110 and, inasmuch as the roller 110 is continually reciprocating longitudinally of the beams 88, the crop is spread evenly within the body 16 fore and aft of the latter. The beams 88 may be raised and lowered through use of the assemblies 92 as the crop builds up above the open top of the body 16 and when the stack is completely formed in body 16 ready for transport to an unloading area the assembly 22 may be lowered, if desired, against the top of the stack to hold the crop in place during such advancement to an unloading area.

Figure 9:
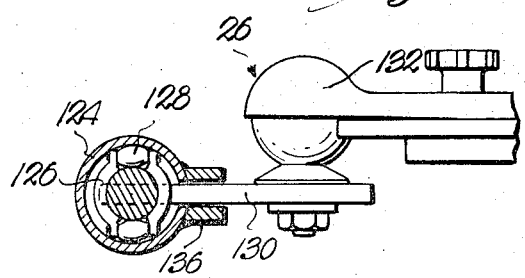
FIG. 9 is a fragmentary detailed cross-sectional view taken on line 9—9 of FIG. 8.

The crop discharging from the conveyor assembly 22 is also distributed evenly within the body 16 transversely of the latter, and this is accomplished through operation of the following structure. The assembly 28 is mounted within a tube 124 (as best seen in FIGS. 2, 8 and 9) carried by the uprights 38. Piston stem 126 of assembly 28 is provided with rollers 128 which travel along the tube 124 therewithin during reciprocation of the stem 126, and a hitch bar 130, coupled with ball and socket joint 132 of hitch 26, is secured to the stem 126. Bar 130 extends through slot 134 in tube 124 and between a pair of slide bars 136 rigid to the tube 124. Accordingly, as the assembly 28 is actuated, either continuously or periodically as desired by the operator through control valves on the towing tractor (not shown), the body 16 is shifted laterally with respect to the overlying conveyor assembly 22. This action augments the fore and aft folding of the crop into the body 16, by operation of reciprocable roller 110, producing side folds 138 in the crop 24 as illustrated in FIGS. 10 and 11 of the drawings.

Figure 6:
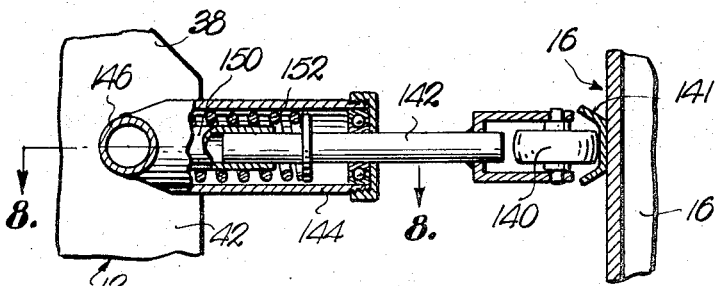
FIG. 6 is a fragmentary side elevational view similar to FIG. 2, showing the spacer device between the loader and the body, parts being broken away and in section for clearness.
Figure 7:
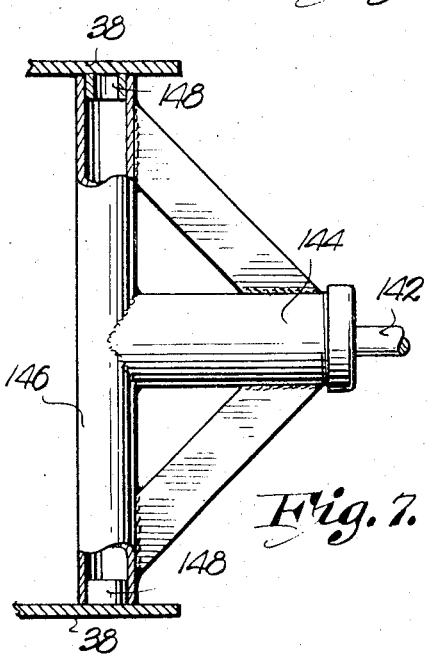
FIG. 7 is a fragmentary plan view of the device shown in FIG. 6.

During such side-to-side reciprocation of the body 16 with respect to the loader 12, a roller 140 (FIGS. 2 and 6) moves horizontally along a generally C-shaped channel 141 mounted on the body 16. The roller 140 is mounted on a shaft 142 which extends into a tube 144 rigid to a cross tube 146. The tube 146 is swingable about studs 148 on the uprights 38 and a guide sleeve 150 within tube 144 is provided for the shaft 142. A spring 152 in tube 144 yieldably biases the roller 140 into the channel 141.

Accordingly, the complete vehicle, which includes the loader 12 and the body 16, is free to ride over uneven terrain because of the rotational movement of the tube 146, the free pivot within the joint 132, and the flared nature of the legs of the channel 141 for roller 140.

Figure 3:
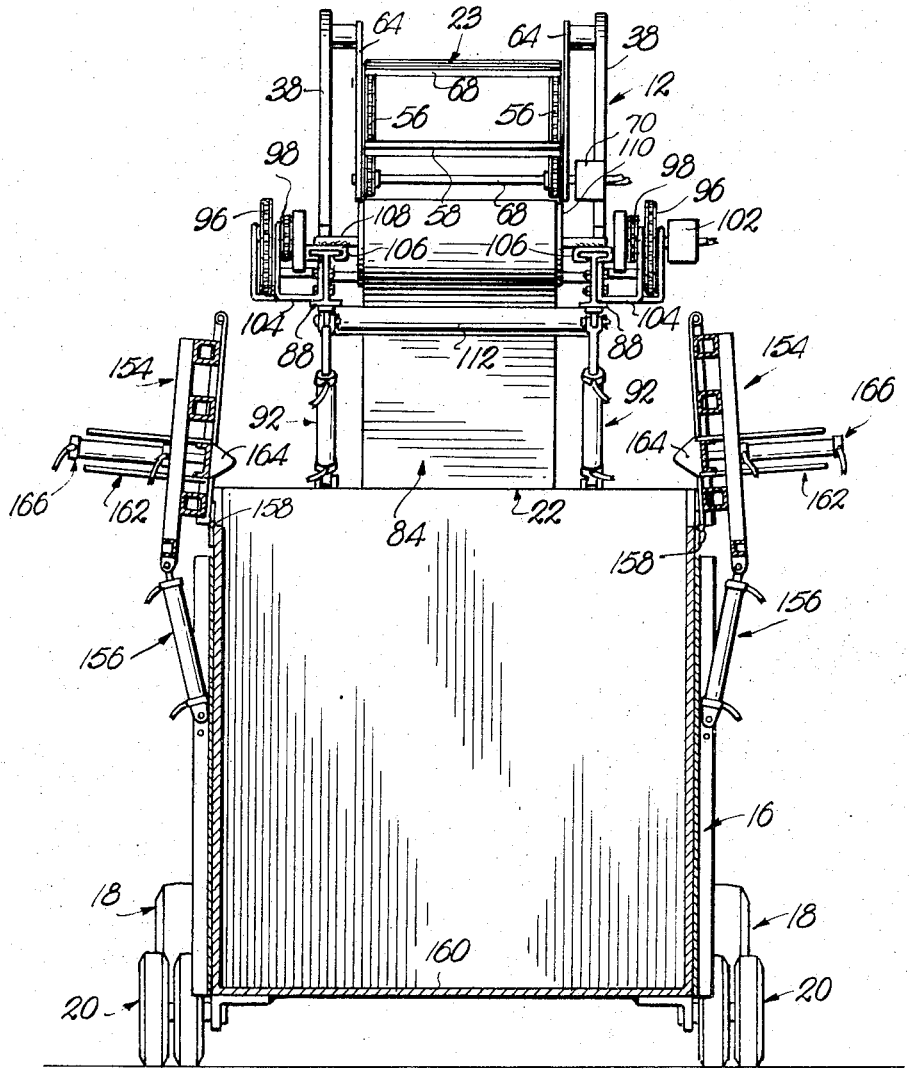
FIG. 3 is a vertical cross-sectional view taken on line 3—3 of FIG. 2.
Figure 4:
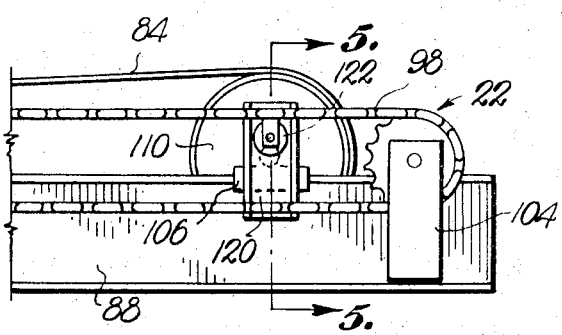
FIG. 4 is a fragmentary elevational view of one end of that portion of the conveyor assembly which overlies the crop receiving body.
Figure 5:
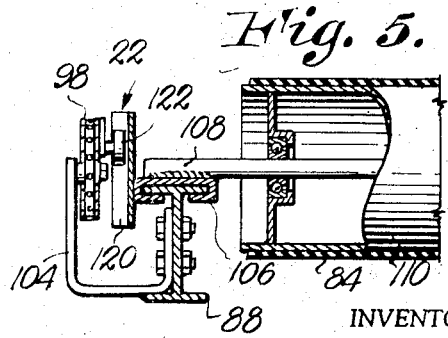
FIG. 5 is a fragmentary cross-sectional view taken on line 5—5 of FIG. 4.
Figure 10:
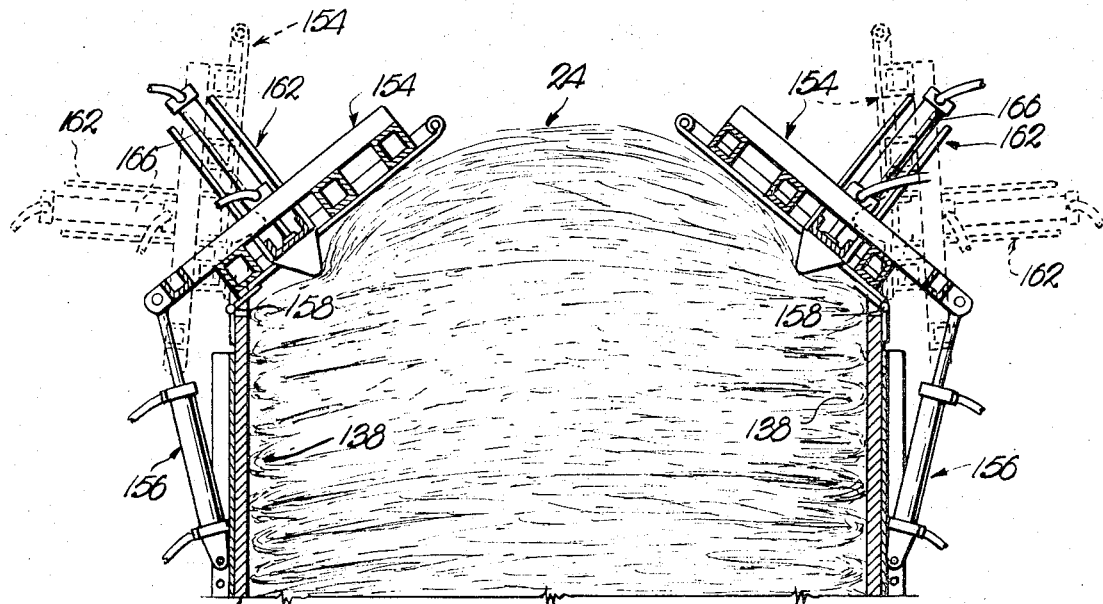
FIG. 10 is a fragmentary cross-sectional view similar to FIG. 3 illustrating one operating position of the compressing mechanism.
Figure 11:
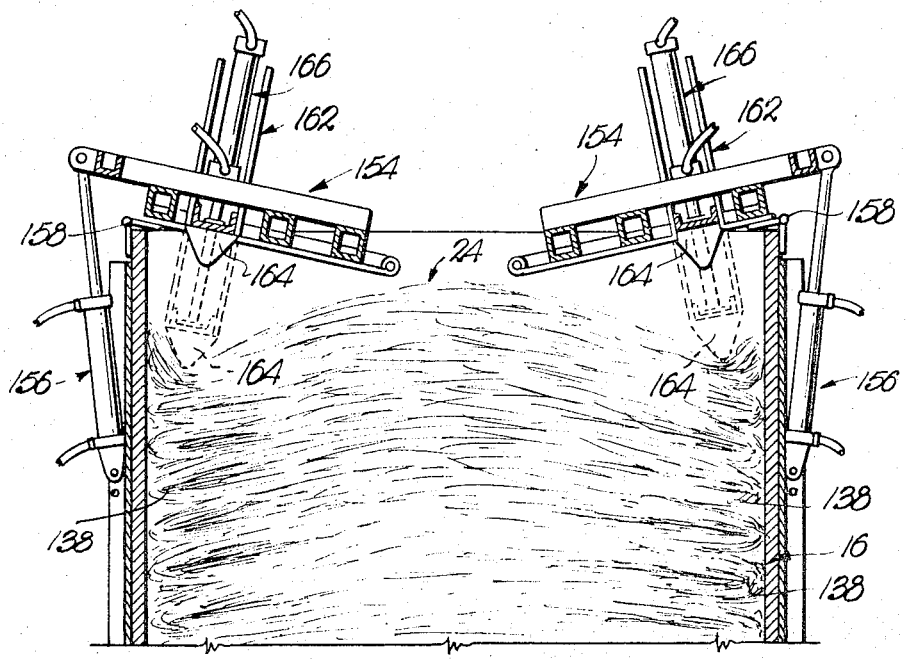
FIG. 11 is a view similar to FIG. 10 showing another operating position of the compressing mechanism.

FIGS. 1, 2 and 3 and particularly FIGS. 10 and 11 illustrate a compressor for the crop 24, utilized from time to time during loading for compacting the crop 24 into a stack that conforms in size and shape with the body 16. Such compressor is in the nature of a pair of identical assemblies carried by the sides of the body 16; therefore, only one will be described.

Each compressor assembly 154 is swingable from the position illustrated in FIGS. 1, 2 and 3 to the positions shown in FIGS. 10 and 11 by actuation of fluid piston and cylinder assembly 156 to cause the pressure assembly 154 to swing inwardly and downwardly about hinges 158, it being seen in FIG. 10 that such action causes the assemblies 154 to press the crop 24 downwardly toward the bed 160 of body 16 as the assemblies 154 move to the position shown in FIG. 11.

Thereupon a secondary pressure device 162, carried by each assembly 154 respectively, is operated to compress and tightly tuck in the folds 138 along the inner faces of the walls of body 16. Each device 162 includes an elongated, generally V-shaped pressure bar 164, coextensive in length with its assembly 154 and actuated by one or more fluid piston and cylinder assemblies 166.

After the stack is thus formed and compressed in the body 16 it is transported to an unloading area, and for this purpose, it is not necessary to transport the loader 12. Instead, the hitch 26 may be disconnected and only the body 16 with its load placed in tow behind a tractor.

At the unloading area the body 16 is tilted to lower its rearmost end whereupon latch 168 for swingable rear end gate 170 is released to permit unloading of the stack through the rear open end of the body 16.

The manner of so tilting the body 16, and the manner of pushing the load off the bed 160 through the open tail gate 170 may take the form of the disclosures of U.S. Pat. No. 3,003,780 issued to Ezra C. Lundahl on Oct. 10, 1961 and/or U.S. Pat. No. 3,241,696 issued to the same inventor on Mar. 22, 1966. Therefore, these two patents are incorporated herein by reference for a disclosure of the aforesaid manner of unloading the completed, compact stack from the body 16.

Having thus described the invention, what is claimed as new and desired to be secured by Letters Patent is:

1. In a harvesting method, the steps of which include:
   advancing a vehicle provided with a crop-receiving body across a field having a crop thereon;
   continuously picking up the crop from the field as the vehicle is advanced;
   continuously raising the picked up crop to a level higher than the bed of the body as the crop is picked up;
   continuously feeding the raised crop into the body as the crop is raised;
   spreading the fed crop evenly throughout the body as the crop is fed;
   shifting a portion of said body which receives said crop downwardly toward said bed from time to time as the crop builds up in the body to compress the crop until a compact stack of the crop is produced, conforming substantially in shape and size with the body;
   transporting the vehicle with the stack in said body thereof to an unloading area; and
   unloading the stack from the body and depositing the same in an upright position on a supporting surface at said area without materially disturbing the shape, size and compactness of the stack.

2. In the invention of claim 1 wherein said fed crop enters the body in a stream that is shifted from time to time fore and aft of said body.

3. In the invention of claim 2 wherein said stream is shifted from time to time laterally of the body.

4. In the invention of claim 2 wherein said stream is reciprocated continuously fore and aft of the body.

5. In the invention of claim 4 wherein said stream is shifted from time to time laterally of the body.

6. In the invention of claim 4 wherein said stream is continuously reciprocated laterally of the body.

7. In the invention of claim 1 wherein the picked up crop is raised to said level at one end of the body, is then transferred above the bed along a path extending fore and aft of the body, and is then fed by gravity into the body.

8. In the invention of claim 1 wherein said body is tilted at said area and the stack is pushed off said bed through one end of the body.

9. In the invention of claim 1 wherein the picked up crop is elevated vertically at the forwardmost end of the body to a level above the latter, is then horizontally conveyed rearwardly over the top of the body, and is then dropped vertically in a continuously gravitating stream into the body.

10. In the invention of claim 9 wherein said stream is reciprocated continuously between the forwardmost and the rearmost ends of the body whereby to fold the crop into a plurality of superimposed layers in the body.

11. In the invention of claim 1 wherein said fed crop enters the body in a stream that is shifted from time to time laterally of the body.

12. In the invention of claim 1 wherein said fed crop enters the body in a stream that is continuously reciprocated laterally of the body.

13. In the invention of claim 1 wherein said compression of the crop includes a primary pressing action on the entire load toward said bed and a secondary pressing action along the sides of the body toward the bed.

14. In the invention of claim 1 wherein said fed crop enters the body in a stream that is continuously reciprocated laterally of the body whereby to fold the crop into a plurality of superimposed layers in the body, and wherein said compression of the crop includes a pressing action on the folds along the sides of the body toward the bed.

* * * * *